(12) United States Patent
Kim et al.

(10) Patent No.: US 10,551,846 B1
(45) Date of Patent: Feb. 4, 2020

(54) LEARNING METHOD AND LEARNING DEVICE FOR IMPROVING SEGMENTATION PERFORMANCE TO BE USED FOR DETECTING ROAD USER EVENTS USING DOUBLE EMBEDDING CONFIGURATION IN MULTI-CAMERA SYSTEM AND TESTING METHOD AND TESTING DEVICE USING THE SAME

(71) Applicant: Stradvision, Inc., Pohang, Gyeongbuk (KR)

(72) Inventors: Kye-Hyeon Kim, Seoul (KR); Yongjoong Kim, Gyeongsangbuk-do (KR); Insu Kim, Gyeongsangbuk-do (KR); Hak-Kyoung Kim, Gyeongsangbuk-do (KR); Woonhyun Nam, Pohang-si (KR); SukHoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Pohang-si (KR); Hongmo Je, Pohang-si (KR); Hojin Cho, Gyeongsangbuk-do (KR)

(73) Assignee: Stradvision, Inc., Pohang, Gyeongbuk (KR)

( * ) Notice: Subject to any disclaimer, the term of this patent is extended or adjusted under 35 U.S.C. 154(b) by 0 days.

(21) Appl. No.: 16/257,993

(22) Filed: Jan. 25, 2019

(51) Int. Cl.
*G06K 9/00* (2006.01)
*G05D 1/02* (2020.01)
(Continued)

(52) U.S. Cl.
CPC ......... *G05D 1/0221* (2013.01); *G05D 1/0246* (2013.01); *G06K 9/00805* (2013.01);
(Continued)

(58) Field of Classification Search
None
See application file for complete search history.

(56) References Cited

U.S. PATENT DOCUMENTS

2018/0114056 A1\* 4/2018 Wang ................. G06K 9/00288
2018/0165809 A1\* 6/2018 Stanitsas ............... G06F 3/0484
(Continued)

*Primary Examiner* — Hadi Akhavannik
(74) *Attorney, Agent, or Firm* — Kaplan Breyer Schwarz, LLP (57) ABSTRACT

A learning method for improving segmentation performance to be used for detecting road user events including pedestrian events and vehicle events using double embedding configuration in a multi-camera system is provided. The learning method includes steps of: a learning device instructing similarity convolutional layer to generate similarity embedding feature by applying similarity convolution operations to a feature outputted from a neural network; instructing similarity loss layer to output a similarity loss by referring to a similarity between two points sampled from the similarity embedding feature, and its corresponding GT label image; instructing distance convolutional layer to generate distance embedding feature by applying distance convolution operations to the similarity embedding feature; instructing distance loss layer to output a distance loss for increasing inter-class differences among mean values of instance classes and decreasing intra-class variance values of the instance classes; backpropagating at least one of the similarity loss and the distance loss.

30 Claims, 3 Drawing Sheets

(51) Int. Cl.
  *G06T 7/194*    (2017.01)
  *G06T 7/70*     (2017.01)
  *G06K 9/62*     (2006.01)
  *G06N 3/08*     (2006.01)
  *G06N 5/04*     (2006.01)
  *G06N 20/00*    (2019.01)

(52) U.S. Cl.
  CPC ....... *G06K 9/00818* (2013.01); *G06K 9/6256* (2013.01); *G06N 3/08* (2013.01); *G06N 5/046* (2013.01); *G06N 20/00* (2019.01); *G06T 7/194* (2017.01); *G06T 7/70* (2017.01); *G05D 2201/0213* (2013.01); *G06T 2207/30261* (2013.01)

(56)  References Cited

U.S. PATENT DOCUMENTS

2018/0174600 A1*  6/2018  Chaudhuri .......... G06K 9/00288
2019/0005313 A1*  1/2019  Vemulapalli ....... G06K 9/00295
2019/0012581 A1*  1/2019  Honkala .............. G06K 9/6212

\* cited by examiner

FIG. 1
(PRIOR ART)

LEARNING METHOD AND LEARNING DEVICE FOR IMPROVING SEGMENTATION PERFORMANCE TO BE USED FOR DETECTING ROAD USER EVENTS USING DOUBLE EMBEDDING CONFIGURATION IN MULTI-CAMERA SYSTEM AND TESTING METHOD AND TESTING DEVICE USING THE SAME

FIELD OF THE DISCLOSURE

The present disclosure relates to a learning method, a learning device, a testing method and a testing device for use with an autonomous vehicle; and more particularly, to the learning method and the learning device for improving segmentation performance to be used for detecting road user events, and the testing method and the testing device using the same.

BACKGROUND OF THE DISCLOSURE

Deep learning is a technology used to cluster or classify objects or data. For example, computers cannot distinguish dogs and cats from photographs only. But a human can easily distinguish those two. To this end, a method called "machine learning" was devised. It is a technique to allow a computer to classify similar things among lots of data inputted thereto. When a photo of an animal similar to a dog is inputted, the computer will classify it as a dog photo.

There have already been many machine learning algorithms to classify data. For example, a decision tree, a Bayesian network, a support vector machine (SVM), an artificial neural network, etc. have been developed. The deep learning is a descendant of the artificial neural network.

Deep Convolution Neural Networks (Deep CNNs) are at the heart of the remarkable development in deep learning. CNNs have already been used in the 90's to solve the problems of character recognition, but their use has become as widespread as it is now thanks to recent research. These deep CNNs won the 2012 ImageNet image classification tournament, crushing other competitors. Then, the convolution neural network became a very useful tool in the field of the machine learning.

Image segmentation is a method of generating at least one label image by using at least one input image. As the deep learning has recently become popular, the segmentation is also performed by using the deep learning. The segmentation had been performed with methods using only an encoder, such as a method for generating the label image by one or more convolution operations. Thereafter, the segmentation has been performed with methods using an encoder-decoder configuration for extracting features of the image by the encoder and restoring them as the label image by the decoder.

Figure 1:
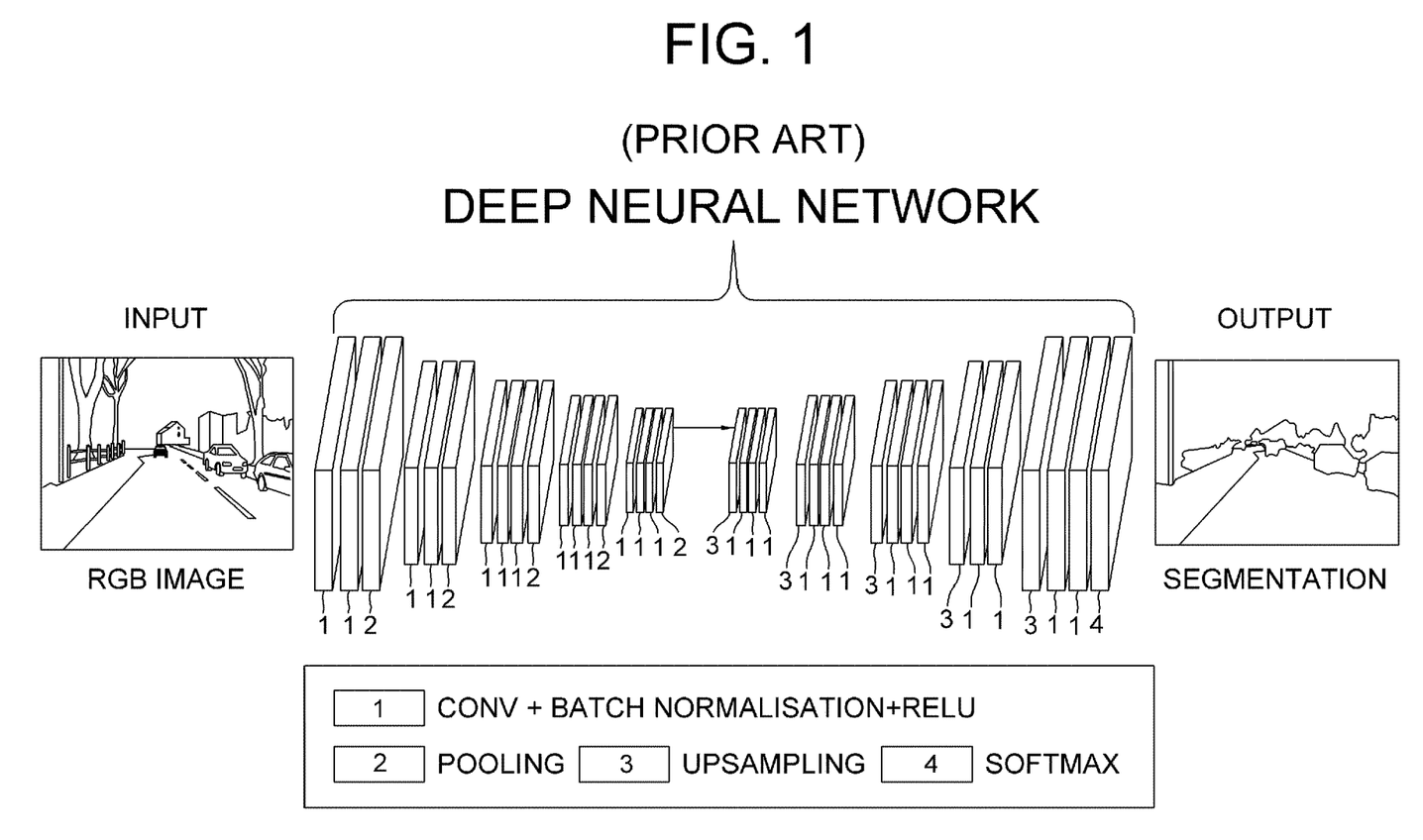
FIG. 1 is a drawing schematically illustrating a process of performing an image segmentation by using a conventional neural network.

FIG. 1 is a drawing schematically illustrating a process of performing the image segmentation by using a conventional neural network.

By referring to FIG. 1, according to a conventional lane detection method, a learning device receives an input image, generates at least one feature map by instructing one or more multiple convolutional layers to apply one or more multiple convolution operations and one or more non-linear operations like ReLU to the input image, and then generates a segmentation result by instructing one or more deconvolutional layers to apply one or more deconvolution operations and SoftMax operations to the feature maps.

However, there is a problem that it is difficult to clearly recognize each of classes by using only the neural network shown in FIG. 1, and especially, it is difficult to precisely recognize information on at least one edge of each of the classes.

In addition, another conventional method of instance segmentation for detecting objects such as lanes is performed through a clustering process after a process of the segmentation. However, since these two processes are disparate processes, there is a problem of poor performance if the two processes are learned together.

SUMMARY OF THE DISCLOSURE

It is an object of the present disclosure to solve all the aforementioned problems.

It is another object of the present disclosure to provide a method for generating a result of instance segmentation without a clustering process and detecting at least one object by using the result of the instance segmentation.

It is still another object of the present disclosure to provide a method of precisely recognizing the object by recognizing each of classes more clearly and extracting at least one edge of each of the classes more accurately through an additional embedding process.

In accordance with one aspect of the present disclosure, there is provided a learning method for instance segmentation, including steps of: (a) a learning device performing a process of acquiring at least one network output feature from a neural network capable of detecting one or more objects in at least one training image; (b) the learning device performing a process of instructing at least one similarity convolutional layer to apply one or more similarity convolution operations to the network output feature, to thereby generate at least one similarity embedding feature, wherein the similarity convolution operations are adopted to output one or more embedding vectors corresponding to at least part of pixels of the network output feature; (c) the learning device performing a similarity embedding process of instructing at least one similarity loss layer to output at least one similarity between two points sampled from the similarity embedding feature and to output at least one similarity loss by referring to the similarity and its corresponding at least one GT label image; (d) the learning device performing a process of instructing at least one distance convolutional layer to apply one or more distance convolution operations to the similarity embedding feature, to thereby generate at least one distance embedding feature, wherein the distance convolution operations are adopted to transform the similarity embedding feature into at least one feature space; (e) the learning device performing a distance embedding process of instructing at least one distance loss layer to calculate each of mean values and each of variance values of each of one or more instance classes by using the distance embedding feature, to thereby output at least one distance loss to be used for increasing each of inter-class differences among each of the mean values of the instance classes and decreasing each of intra-class variance values of each of the instance classes; and (f) the learning device performing a process of learning one or more parameters of at least one of the distance convolutional layer, the similarity convolutional layer, and the neural network by backpropagating at least one of the similarity loss and the distance loss.

As one example, the learning method further includes a step of: (g) the learning device performing a process of instructing at least one sampling layer and at least one detecting layer to recognize the objects individually by sampling the distance embedding feature and by finding locations of the objects through regression, to thereby generate at least one instance segmentation.

As one example, the learning method further includes a step of: (h) the learning device performing a process of instructing at least one segmentation loss layer to output at least one segmentation loss by referring to the instance segmentation and its corresponding at least one GT label image, to thereby learn the parameters of at least one of the distance convolutional layer, the similarity convolutional layer, and the neural network by backpropagating the segmentation loss.

As one example, the GT label image is one corresponding to the instance segmentation.

As one example, a range of change in the parameters of the similarity convolutional layer is determined as higher than that in the parameters of the neural network, and a range of change in the parameters of the distance convolutional layer is determined as higher than that in the parameters of the neural network or that in the parameters of the similarity convolutional layer.

As one example, the similarity is represented as a following equation $$s = \frac{2}{1 + \exp(\|f_p - f_q\|_2)}$$

where the $f_p$ and the $f_q$ represent the two points randomly sampled from the similarity embedding feature, wherein the similarity loss is a cross entropy loss represented as a following equation $$\text{Similarity loss} = -\frac{1}{A} \sum_{p,q \in A} [y\log(s) + (1-y)\log(1-s)]$$

where the A represents the number of combinations acquired from the two points randomly sampled from the similarity embedding feature, the y is 1 if the two points are in a same class, or 0 if the points are in different classes, and the s represents the similarity.

As one example, the objects represent one or more lanes.

As one example, the distance loss is a clustering loss represented as a following equation $$\frac{\frac{1}{n}\sum_i \text{var}(L_i) + \frac{\sum_{L_1 \in Lanes, L_2 \in Lanes} \max(0, \text{thresh}^2 - (\text{mean}(L_1) - \text{mean}(L_2))^2)}{\text{n\_combination}(L_1, L_2)}}{\text{thresh}^2}$$

where the $L_1$ and the $L_2$ represent two lanes randomly selected from the lanes, the mean($L_1$) represents a mean value of the $L_1$, the mean($L_2$) represents a mean value of the $L_2$, the var($L_i$) represents each variance value of each lane among the lanes, the n_combination($L_1$, $L_2$) represents the number of cases of selecting every combination of any two lanes among the lanes, and the thresh represents a threshold.

As one example, the thresh is set to be 1.

In accordance with another aspect of the present disclosure, there is provided a testing method for instance segmentation, including steps of: (a) on condition that a learning device (i) has performed a process of instructing at least one similarity convolutional layer to apply one or more similarity convolution operations to at least one network output feature for training acquired from a neural network capable of detecting one or more objects for training in at least one training image, to thereby generate at least one similarity embedding feature for training, wherein the similarity convolution operations are adopted to output one or more embedding vectors for training corresponding to at least part of pixels of the network output feature for training, (ii) has performed a similarity embedding process of instructing at least one similarity loss layer to output at least one similarity between two points sampled from the similarity embedding feature for training and to output at least one similarity loss by referring to the similarity and its corresponding at least one GT label image, (iii) has performed a process of instructing at least one distance convolutional layer to apply one or more distance convolution operations to the similarity embedding feature for training, to thereby generate at least one distance embedding feature for training, wherein the distance convolution operations are adopted to transform the similarity embedding feature for training into at least one feature space for training, (iv) has performed a distance embedding process of instructing at least one distance loss layer to calculate each of mean values and each of variance values of each of one or more instance classes by using the distance embedding feature for training, to thereby output at least one distance loss to be used for increasing each of inter-class differences among each of the mean values of the instance classes and decreasing each of intra-class variance values of each of the instance classes; and (v) has performed a process of learning one or more parameters of at least one of the distance convolutional layer, the similarity convolutional layer, and the neural network by backpropagating at least one of the similarity loss and the distance loss, a testing device acquiring at least one network output feature for testing from the neural network capable of detecting one or more objects for testing in at least one test image; (b) the testing device performing a process of instructing the similarity convolutional layer to apply the similarity convolution operations to the network output feature for testing, to thereby generate at least one similarity embedding feature for testing, wherein the similarity convolution operations are adopted to output one or more embedding vectors for testing corresponding to at least part of pixels of the network output feature for testing; (c) the testing device performing a process of instructing the distance convolutional layer to apply the distance convolution operations to the similarity embedding feature for testing, to thereby generate at least one distance embedding feature for testing, wherein the distance convolution operations are adopted to transform the similarity embedding feature for testing into at least one feature space for testing; and (d) the testing device performing a process of instructing at least one sampling layer and at least one detecting layer to recognize one or more objects for testing individually by sampling the distance embedding feature for testing and by finding locations of the objects for testing through regression, to thereby generate at least one instance segmentation for testing.

As one example, at the step of (a), the learning device further has performed processes of (vi) instructing the sampling layer and the detecting layer to recognize the objects for training individually by sampling the distance embedding feature for training and by finding locations of the objects for training through the regression, to thereby generate at least one instance segmentation for training and (vii) instructing at least one segmentation loss layer to output at least one segmentation loss by referring to the instance segmentation for training and its corresponding at least one GT label image, to thereby learn the parameters of at least one of the distance convolutional layer, the similarity convolutional layer, and the neural network by backpropagating the segmentation loss.

As one example, the GT label image is one corresponding to the instance segmentation for training.

As one example, a range of change in the parameters of the similarity convolutional layer is determined as higher than that in the parameters of the neural network, and a range of change in the parameters of the distance convolutional layer is determined as higher than that in the parameters of the neural network or that in the parameters of the similarity convolutional layer.

As one example, the similarity is represented as a following equation $$s = \frac{2}{1 + \exp(\|f_p - f_q\|_2)}$$

where the $f_p$ and the $f_q$ represent the two points randomly sampled from the similarity embedding feature, wherein the similarity loss is a cross entropy loss represented as a following equation $$\text{Similarity loss} = -\frac{1}{A} \sum_{p,q \in A} [y \log(s) + (1-y)\log(1-s)]$$

where the A represents the number of combinations acquired from the two points randomly sampled from the similarity embedding feature, the y is 1 if the two points are in a same class, or 0 if the points are in different classes, and the s represents the similarity.

As one example, the objects for training represents one or more lanes, wherein the distance loss is a clustering loss represented as a following equation $$\frac{\frac{1}{n}\sum_i \text{var}(L_i) + \frac{\sum_{L_1 \in Lanes, L_2 \in Lanes} \max(0, \text{thresh}^2 - (\text{mean}(L_1) - \text{mean}(L_2))^2)}{\text{n\_combination}(L_1, L_2)}}{\text{thresh}^2}$$

where the $L_1$ and the $L_2$ represent two lanes randomly selected from the lanes, the mean($L_1$) represents a mean value of the $L_1$, the mean($L_2$) represents a mean value of the $L_2$, the var($L_i$) represents each variance value of each lane among the lanes, the n_combination($L_1$, $L_2$) represents the number of cases of selecting every combination of any two lanes among the lanes, and the thresh represents a threshold.

In accordance with still another aspect of the present disclosure, there is provided a learning device for instance segmentation, including: at least one memory that stores instructions; and at least one processor configured to execute the instructions to: (I) perform a process of instructing at least one similarity convolutional layer to apply one or more similarity convolution operations to at least one network output feature acquired from a neural network capable of detecting one or more objects in at least one training image, to thereby generate at least one similarity embedding feature, wherein the similarity convolution operations are adopted to output one or more embedding vectors corresponding to at least part of pixels of the network output feature, (II) perform a similarity embedding process of instructing at least one similarity loss layer to output at least one similarity between two points sampled from the similarity embedding feature and to output at least one similarity loss by referring to the similarity and its corresponding at least one GT label image, (III) perform a process of instructing at least one distance convolutional layer to apply one or more distance convolution operations to the similarity embedding feature, to thereby generate at least one distance embedding feature, wherein the distance convolution operations are adopted to transform the similarity embedding feature into at least one feature space, (IV) perform a distance embedding process of instructing at least one distance loss layer to calculate each of mean values and each of variance values of each of one or more instance classes by using the distance embedding feature, to thereby output at least one distance loss to be used for increasing each of inter-class differences among each of the mean values of the instance classes and decreasing each of intra-class variance values of each of the instance classes, and (V) perform a process of learning one or more parameters of at least one of the distance convolutional layer, the similarity convolutional layer, and the neural network by backpropagating at least one of the similarity loss and the distance loss.

As one example, the processor further performs a process of: (VI) instructing at least one sampling layer and at least one detecting layer to recognize the objects individually by sampling the distance embedding feature and by finding locations of the objects through regression, to thereby generate at least one instance segmentation.

As one example, the processor further performs a process of: (VII) instructing at least one segmentation loss layer to output at least one segmentation loss by referring to the instance segmentation and its corresponding at least one GT label image, to thereby learn the parameters of at least one of the distance convolutional layer, the similarity convolutional layer, and the neural network by backpropagating the segmentation loss.

As one example, the GT label image is one corresponding to the instance segmentation.

As one example, a range of change in the parameters of the similarity convolutional layer is determined as higher than that in the parameters of the neural network, and a range of change in the parameters of the distance convolutional layer is determined as higher than that in the parameters of the neural network or that in the parameters of the similarity convolutional layer.

As one example, the similarity is represented as a following equation $$s = \frac{2}{1 + \exp(\|f_p - f_q\|_2)}$$

where the $f_p$ and the $f_q$ represent the two points randomly sampled from the similarity embedding feature, wherein the similarity loss is a cross entropy loss represented as a following equation $$\text{Similarity loss} = -\frac{1}{A} \sum_{p,q \in A} [y\log(s) + (1-y)\log(1-s)]$$

where the A represents the number of combinations acquired from the two points randomly sampled from the similarity embedding feature, the y is 1 if the two points are in a same class, or 0 if the points are in different classes, and the s represents the similarity.

As one example, the objects represent one or more lanes.

As one example, the distance loss is a clustering loss represented as a following equation $$\frac{\frac{1}{n}\sum_i \text{var}(L_i) + \sum_{L_1 \in Lanes, L_2 \in Lanes} \max\left(0, \frac{\text{thresh}^2 - (\text{mean}(L_1) - \text{mean}(L_2))^2}{\text{n\_combination}(L_1, L_2)}\right)}{\text{thresh}^2}$$

where the $L_1$ and the $L_2$ represent two lanes randomly selected from the lanes, the mean($L_1$) represents a mean value of the $L_1$, the mean($L_2$) represents a mean value of the $L_2$, the var($L_i$) represents each variance value of each lane among the lanes, the n_combination($L_1, L_2$) represents the number of cases of selecting every combination of any two lanes among the lanes, and the thresh represents a threshold.

As one example, the thresh is set to be 1.

In accordance with still yet another aspect of the present disclosure, there is provided a testing device for instance segmentation, including: at least one memory that stores instructions; and at least one processor, on condition that a learning device, if at least one network output feature for training is acquired from a neural network capable of detecting one or more objects for training in at least one training image, (i) has performed a process of instructing at least one similarity convolutional layer to apply one or more similarity convolution operations to the network output feature for training, to thereby generate at least one similarity embedding feature for training, wherein the similarity convolution operations are adopted to output one or more embedding vectors for training corresponding to at least part of pixels of the network output feature for training, (ii) has performed a similarity embedding process of instructing at least one similarity loss layer to output at least one similarity between two points sampled from the similarity embedding feature for training and to output at least one similarity loss by referring to the similarity and its corresponding at least one GT label image, (iii) has performed a process of instructing at least one distance convolutional layer to apply one or more distance convolution operations to the similarity embedding feature for training, to thereby generate at least one distance embedding feature for training, wherein the distance convolution operations are adopted to transform the similarity embedding feature for training into at least one feature space for training, (iv) has performed a distance embedding process of instructing at least one distance loss layer to calculate each of mean values and each of variance values of each of one or more instance classes by using the distance embedding feature for training, to thereby output at least one distance loss to be used for increasing each of inter-class differences among each of the mean values of the instance classes and decreasing each of intra-class variance values of each of the instance classes; and (v) has performed a process of learning one or more parameters of at least one of the distance convolutional layer, the similarity convolutional layer, and the neural network by backpropagating at least one of the similarity loss and the distance loss; configured to execute the instructions to: (I) perform a process of instructing the similarity convolutional layer to apply the similarity convolution operations to at least one network output feature for testing acquired from the neural network capable of detecting one or more objects for testing in at least one test image, to thereby generate at least one similarity embedding feature for testing, wherein the similarity convolution operations are adopted to output one or more embedding vectors for testing corresponding to at least part of pixels of the network output feature for testing, (II) perform a process of instructing the distance convolutional layer to apply the distance convolution operations to the similarity embedding feature for testing, to thereby generate at least one distance embedding feature for testing, wherein the distance convolution operations are adopted to transform the similarity embedding feature for testing into at least one feature space for testing, and (III) perform a process of instructing at least one sampling layer and at least one detecting layer to recognize the objects for testing individually by sampling the distance embedding feature for testing and by finding locations of the objects for testing through regression, to thereby generate at least one instance segmentation for testing.

As one example, the learning device further has performed processes of (vi) instructing the sampling layer and the detecting layer to recognize the objects for training individually by sampling the distance embedding feature for training and by finding locations of the objects for training through the regression, to thereby generate at least one instance segmentation for training and (vii) instructing at least one segmentation loss layer to output at least one segmentation loss by referring to the instance segmentation for training and its corresponding at least one GT label image, to thereby learn the parameters of at least one of the distance convolutional layer, the similarity convolutional layer, and the neural network by backpropagating the segmentation loss.

As one example, the GT label image is one corresponding to the instance segmentation for training.

As one example, a range of change in the parameters of the similarity convolutional layer is determined as higher than that in the parameters of the neural network, and a range of change in the parameters of the distance convolutional layer is determined as higher than that in the parameters of the neural network or that in the parameters of the similarity convolutional layer.

As one example, the similarity is represented as a following equation $$s = \frac{2}{1 + \exp(\|f_p - f_q\|_2)}$$

where the $f_p$ and the $f_q$ represent the two points randomly sampled from the similarity embedding feature, wherein the similarity loss is a cross entropy loss represented as a following equation $$\text{Similarity loss} = -\frac{1}{A} \sum_{p,q \in A} [y\log(s) + (1-y)\log(1-s)]$$

where the A represents the number of combinations acquired from the two points randomly sampled from the similarity embedding feature, the y is 1 if the two points are in a same class, or 0 if the points are in different classes, and the s represents the similarity.

As one example, the objects for training represents one or more lanes, wherein the distance loss is a clustering loss represented as a following equation $$\frac{\dfrac{1}{n}\sum_{i} \text{var}(L_i) + \dfrac{\sum_{L_1 \in Lanes, L_2 \in Lanes} \max(0, \text{thresh}^2 - (\text{mean}(L_1) - \text{mean}(L_2))^2)}{\text{n\_combination}(L_1, L_2)}}{\text{thresh}^2}$$

where the $L_1$ and the $L_2$ represent two lanes randomly selected from the lanes, the mean($L_1$) represents a mean value of the $L_1$, the mean($L_2$) represents a mean value of the $L_2$, the var($L_i$) represents each variance value of each lane among the lanes, the n_combination($L_1$, $L_2$) represents the number of cases of selecting every combination of any two lanes among the lanes, and the thresh represents a threshold.

BRIEF DESCRIPTION OF THE DRAWINGS

The above and other objects and features of the present disclosure will become apparent from the following description of preferred embodiments given in conjunction with the accompanying drawings.

DETAILED DESCRIPTION OF THE PREFERRED EMBODIMENTS

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached drawings will be explained in detail as shown below.

A feature embedding method using a metric learning has been studied extensively since the days of machine learning. Recently, there are a lot of dissertations on various embedding methods using a deep learning. A word embedding method can map at least one word to at least one vector in r-dimensions. For example, a word 'cat' may be mapped to at least one vector and a character may be transformed to at least one number with meaning. Another embedding method in the field of vision can transform at least one image to at least one specific feature space. Further, the metric learning refers to a learning performed through at least one measurement on similarity, distance, etc.

Figure 2:
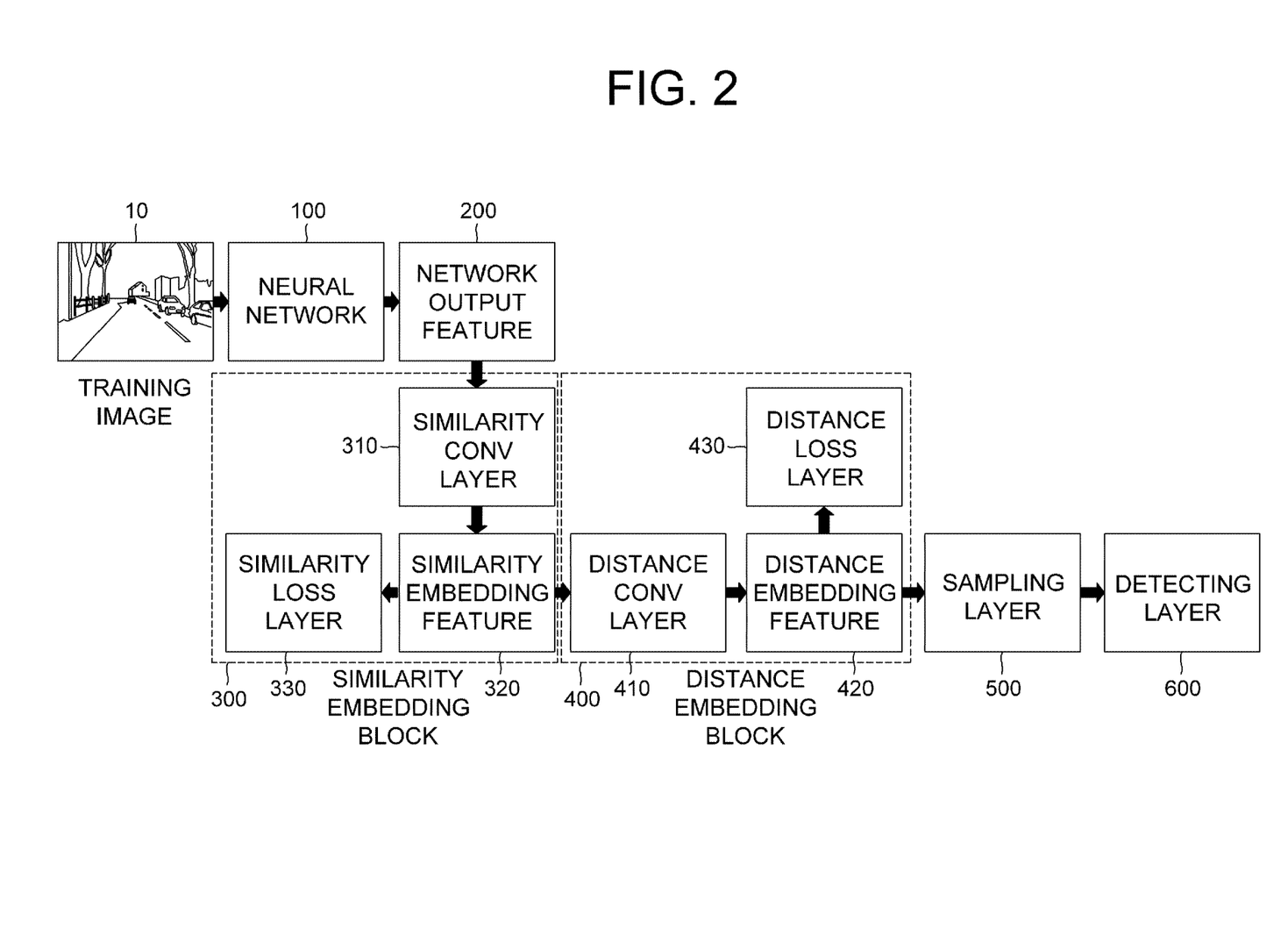
FIG. 2 is a drawing schematically illustrating a method for detecting one or more objects by additionally using a so-called double embedding configuration in accordance with one example embodiment of the present disclosure.

FIG. 2 is a drawing schematically illustrating a learning method for detecting one or more objects by additionally using a so-called double embedding configuration in accordance with one example embodiment of the present disclosure.

By referring to FIG. 2, the learning method for detecting the objects in accordance with the present disclosure may generate a result of an instance segmentation by using a pre-learned DNN (Deep Neural Network) and additionally using a so-called double embedding configuration. In other words, the neural network 100 in FIG. 2 may include an encoder-decoder configuration of the DNN shown in FIG. 1. Herein, at least one network output feature may be acquired from the neural network 100 and, in addition, a double embedding process may be applied to the network output feature.

By referring to FIG. 2 again, a similarity embedding block 300 and a distance embedding block 400 may be connected to an output side of the pre-learned neural network 100 in the present disclosure. In addition, at least one sampling layer 500 and at least one detecting layer 600 may further be connected to an output side of the distance embedding block 400 in order to detect the objects such as lanes. The similarity embedding block 300 and the distance embedding block 400 may be additionally learned through fine-tuning.

Figure 3:
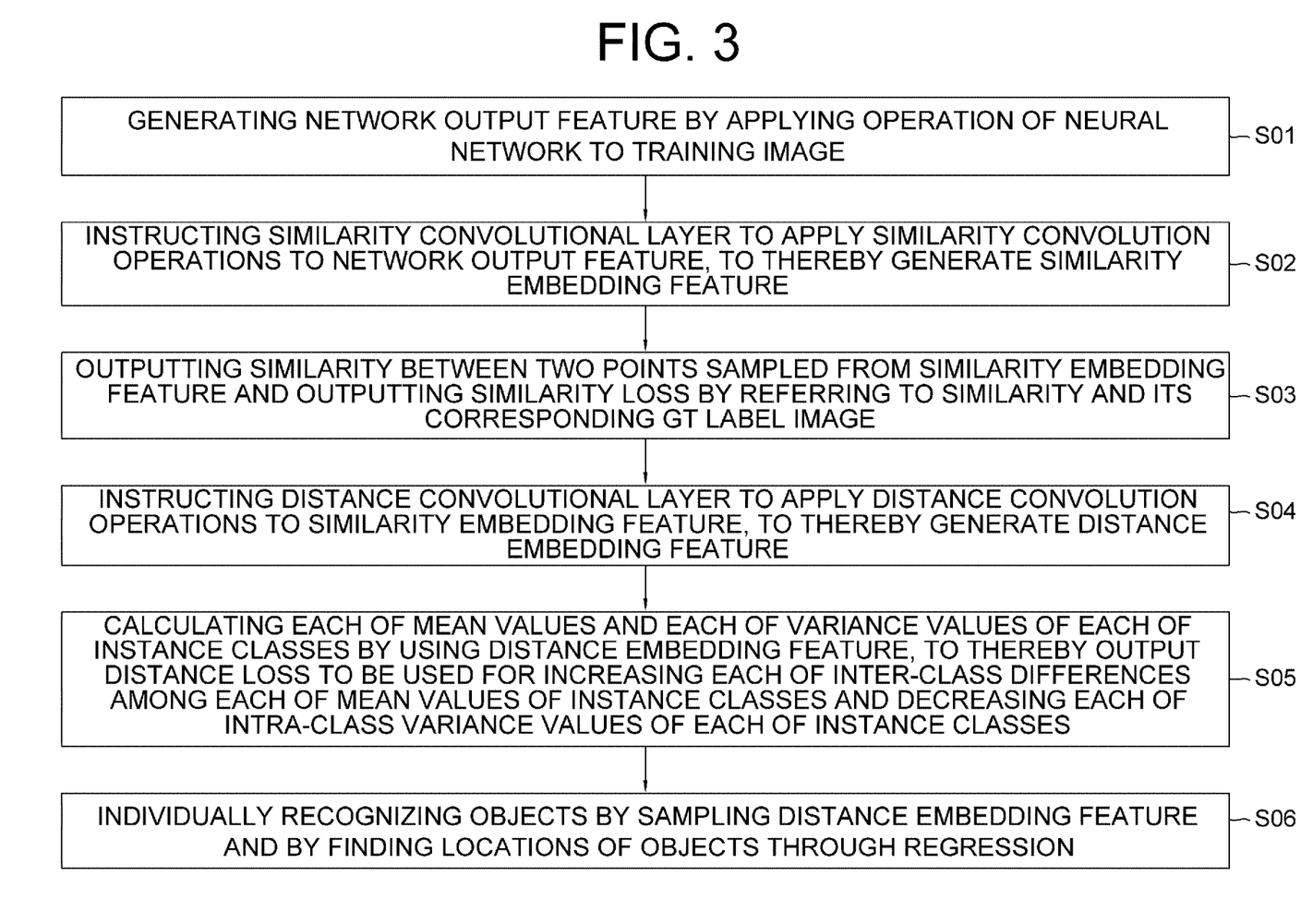
FIG. 3 is a flow chart illustrating a learning process for improving a performance of the image segmentation by using the double embedding configuration in accordance with one example embodiment of the present disclosure.

FIG. 3 is a flow chart illustrating a learning process for improving a performance of an image segmentation by using the double embedding configuration in accordance with one example embodiment of the present disclosure.

By referring to FIGS. 2 and 3, in the learning method for the instance segmentation in accordance with the present disclosure, the network output feature 200 may be generated by applying at least one operation of the neural network 100 to at least one training image 10 at the step of S01. Herein, at least one operation of the encoder-decoder configuration of the DNN shown in FIG. 1 may be used for the operation of the neural network 100.

Next, at least one similarity convolutional layer 310 may be instructed to apply one or more similarity convolution operations to the network output feature 200, to thereby generate at least one similarity embedding feature 320, wherein the similarity convolution operations are adopted to output one or more embedding vectors corresponding to at least part of pixels of the network output feature 200, at a step of S02.

Even in case of fine-tuning the similarity convolutional layer 310 and the distance convolutional layer 410 in FIG. 2 by using the network output feature 200 outputted from the neural network 100 whose parameters have been learned, an appropriate result of the instance segmentation may not be acquired. This is because the network output feature 200 is merely generated by reusing the already-learned parameters, although the neural network 100 may be slightly relearned by the above-mentioned fine-tuning. Therefore, in the present disclosure, the similarity convolutional layer 310 may be added in order to apply the similarity convolution operations to the network output feature 200. Further, the similarity convolutional layer 310 may perform an embedding process as it is in an initialized state. Thus, the similarity convolutional layer 310 may convert feature space of the network output feature 200 into at least one similarity embedding feature 320.

Meanwhile, by referring to FIGS. 2 and 3, learning, i.e., fine-tuning, one or more parameters of the similarity convolutional layer 310 may be performed by using the similarity embedding feature 320 through at least one similarity loss layer 330. The similarity loss layer 330 may output at least one similarity between two points sampled from the similarity embedding feature 320 and output at least one similarity loss by referring to the similarity and its corresponding at least one GT label image, at a step of S03. Herein, the GT label image may be at least one GT image corresponding to the instance segmentation.

The similarity may be outputted by randomly sampling two points from a feature map, i.e., the similarity embedding feature 320, and calculating them according to a following equation.

$$s = \frac{2}{1+\exp(\|f_p - f_q\|_2)} \qquad \text{<Equation 1>}$$

The above $f_p$ and $f_q$ are the two points randomly sampled from the similarity embedding feature 320.

As each instance class of each of the objects in the GT label image corresponding to the instance segmentation is already known, the similarity between two points can be calculated by sampling some points per said each instance class. The $\exp(\|f_p - f_q\|_2)$ in the equation 1 may represent a Euclidean distance between the two points. If the two points are close to each other, the distance may become approximately 0, exp(0) may become approximately 1, and the similarity S may become approximately 1. If the two points are far from each other, the similarity S may become approximately 0, as exp(∞) may become approximately ∞. It is a metric method to measure the similarity between the two points as stated above, and the present disclosure is to perform the learning by using the metric method. Herein, instead of measuring the distance between the two points, other elements can be measured to be used for the learning.

Further, the similarity loss outputted from the similarity loss layer 330 may be calculated according to a following equation.

$$\text{Similarity loss} = -\frac{1}{A}\sum_{p,q \in A}[y\log(s) + (1-y)\log(1-s)] \qquad \text{<Equation 2>}$$

The A represents the number of combinations acquired from every two points randomly sampled from the similarity embedding feature 320, the y is 1 if the two points are in a same class, or 0 if the points are in different classes, and the s represents the similarity.

The similarity loss of the Equation 2 is a cross entropy loss calculated by using the similarity from the Equation 1. The similarity loss calculated as mentioned above may be backpropagated to learn the parameters of the similarity convolutional layer. Through the backpropagation, similar classes included in the similarity embedding feature 320 may be clustered with each other.

Herein, when the similarity loss is backpropagated, a range of change in the parameters of the similarity convolutional layer may be determined as higher than that in the parameters of the neural network 100. Then, the parameters of the similarity convolutional layer 310 are tuned minutely by using the similarity loss.

Meanwhile, the similarity embedding feature 320 may be generated by desirably grouping similar classes together, but edge parts in the similarity embedding feature 320 may still not be clear. In other words, the features generated from a first embedding process, i.e., the similarity embedding process, may be sufficient to distinguish the different classes, but there may be a disadvantage that the edge parts may not be distinguished accurately. Thus, a second embedding process may be needed to overcome the disadvantage aforementioned. Accordingly, as shown in FIG. 2, the distance embedding block 400 may be further provided in accordance with the present disclosure. That is, the distance convolutional layer 410 may be further connected to an output side of the similarity convolutional layer 310.

By referring to FIGS. 2 and 3, the learning device may instruct the distance convolutional layer 410 to apply one or more distance convolution operations to the similarity embedding feature 320, to thereby generate at least one distance embedding feature 420, wherein the distance convolution operations are adopted to transform the similarity embedding feature 320 into at least one feature space, at a step of S04.

Then, at least one distance loss layer 430 may calculate each of mean values and each of variance values of each of one or more instance classes by using the distance embedding feature 420, to thereby output at least one distance loss to be used for increasing each of inter-class differences among each of the mean values of the instance classes and decreasing each of intra-class variance values of each of the instance classes, at a step of S05.

A following equation is an equation to calculate the distance loss for the distance embedding process.

$$\text{a. distance loss} = \frac{1}{n}\sum_i \text{var}(L_i) + \frac{\sum_{L_1 \in Lanes, L_2 \in Lanes} \max(0, \text{thresh}^2 - (\text{mean}(L_1) - \text{mean}(L_2))^2)}{\text{n\_combination}(L_1, L_2)}$$ <Equation 3>

The $L_1$ and the $L_2$ represent two lanes randomly selected from the lanes, the mean($L_1$) represents a mean value of the $L_1$, the mean($L_2$) represents a mean value of the $L_2$, the var($L_i$) represents each variance value of each lane among the lanes, the n_combination(L1, L2) represents the number of cases of selecting every combination of any two lanes among the lanes, and the thresh represents a threshold.

The above-mentioned second embedding process, i.e., the distance embedding process, may be applied to the similarity embedding feature 320 still having the unclear edge parts due to the first embedding process, i.e., the similarity embedding process, during which only the similarity is considered. The distance embedding process may be performed so that each variance value may decrease and the differences among each of the mean values may increase. Therefore, if the distance embedding process is performed, at least one error of the edge parts having large variance values may be learned, and accordingly the distance embedding feature 420, in which the similar classes are grouped together and the inter-class differences are increased, may be generated.

The distance loss may be explained as follows. If six lanes exist in the training image 10, each mean value of a first lane $L_1$ and a second lane $L_2$ among the six lanes may be calculated and a difference between the mean values may be calculated. If the square of the difference is bigger than the square of the threshold, i.e., the thresh$^2$, the max may be 0, and if the square of the differences is equal to or smaller than the square of the threshold, the max may be thresh$^2$−(mean $(L_1)$−mean$(L_2))^2$. The n_combination(L1, L2) is the number of cases of selecting every combination of any two lanes among the six lanes. The threshold may be 1. In addition, each variance value of every lane may be calculated and used in the above equation. In this way, the difference between the mean values may become increased and each variance value of each lane may become decreased during the learning process.

By performing the distance embedding process, each mean value of each of the objects in the training image, i.e., each mean value of each of their corresponding classes, may become more different from each other so that the objects are more distinguishable in the distance embedding feature 420, and each variance value of each of the classes may become smaller so that the similar classes corresponding to the objects in the distance embedding feature 420 may be grouped together. If the distance embedding feature 420 has unclear edge parts, each variance value at each of the unclear edge parts may be large. Thus, each variance value at each of the edge parts may be learned to decrease so that each of the edge parts may belong to each corresponding class. Further, since each mean value of each of the different classes tends to be different from each other in the distance embedding feature 420, each of the classes may be learned to have each different color, i.e., each different label value.

Herein, while backpropagating the distance loss, a range of change in one or more parameters of the distance convolutional layer 410 may be determined as higher than that in the parameters of the neural network 100 or that in the parameters of the similarity convolutional layer 310, and then the parameters of the distance convolutional layer 410 may be tuned minutely. Also, the range of change in the similarity convolutional layer 310 and the range of change in the distance convolutional layer 410 may be determined as higher than that in the parameters of the neural network 100, and then the parameters of the similarity convolutional layer 310 and the parameters of the distance convolutional layer 410 may be tuned minutely.

For example, on condition that the neural network 100 has been learned, the parameters of the similarity convolutional layer 310 may be learned by backpropagating the similarity loss, with a weight assigned to the parameters of the similarity convolutional layer 310 being 1 and that assigned to the parameters of the neural network 100 being $\frac{1}{10}$. Also, the parameters of the distance convolutional layer 410 may be learned by backpropagating the distance loss, with a weight assigned to the parameters of the distance convolutional layer 410 being 1, that assigned to the parameters of the neural network 100 being $\frac{1}{10}$ and that assigned to the parameters of the similarity convolutional layer 310 being $\frac{1}{10}$.

The sampling layer 500 and the detecting layer 600 in FIG. 2 may be configured to recognize the objects individually by sampling the distance embedding feature 420 generated from the double embedding configuration and by finding locations of the objects, e.g. the lanes, through regression. By referring to FIG. 3, the objects may be individually recognized by sampling the distance embedding feature 420 and by finding locations of the objects through the regression, at a step of S06. For example, each of the lanes may be separated from a road after the instance segmentation by using the double embedding process, but since the instance segmentation of the lanes may not be precise, the sampling may be used to reduce the number of false positive and precise pixels of the lanes may be found through the regression. Consequently, the instance segmentation may be generated where the objects are separated with each other and the edge parts are clear.

Meanwhile, though not illustrated in FIG. 2, the learning device may further perform a process of instructing at least one segmentation loss layer to output at least one segmentation loss by referring to the instance segmentation and its corresponding GT label image, to thereby learn the parameters of at least one of the distance convolutional layer 410, the similarity convolutional layer 310, and the neural network 100 by backpropagating the segmentation loss.

Also, the learning method illustrated in FIGS. 2 and 3 may be applied to a testing method of the neural network 100.

For reference, in the description below, the phrase "for training" is added for terms related to the learning processes, and the phrase "for testing" is added for terms related to testing processes, to avoid possible confusion.

That is, the testing method for the instance segmentation may include steps of: (a) a testing device acquiring at least one network output feature for testing from the neural network 100 capable of detecting one or more lanes in at least one test image, on condition that the learning device (i) has performed a process of acquiring at least one network output feature for training from the neural network 100 capable of detecting one or more objects for training in the training image 10, (ii) has performed a process of instructing the similarity convolutional layer 310 to apply the similarity convolution operations to the network output feature for training, to thereby generate at least one similarity embedding feature for training, wherein the similarity convolution operations are adopted to output one or more embedding vectors for training corresponding to at least part of pixels of the network output feature for training, (iii) has performed the similarity embedding process of instructing the similarity loss layer 330 to output the similarity between two points sampled from the similarity embedding feature for training and to output the similarity loss by referring to the similarity and its corresponding at least one GT label image, (iv) has performed a process of instructing the distance convolutional layer 410 to apply the distance convolution operations to the similarity embedding feature for training, to thereby generate at least one distance embedding feature for training, wherein the distance convolution operations are adopted to transform the similarity embedding feature for training into at least one feature space for training, (v) has performed the distance embedding process of instructing the distance loss layer 430 to calculate each of mean values and each of variance values of each of one or more instance classes by using the distance embedding feature for training, to thereby output at least one distance loss to be used for increasing each of inter-class differences among each of the mean values of the instance classes and decreasing each of intra-class variance values of each of the instance classes; and (vi) has performed a process of learning one or more parameters of at least one of the distance convolutional layer 410, the similarity convolutional layer 310, and the neural network 100 by backpropagating at least one of the similarity loss and the distance loss; (b) the testing device performing a process of instructing the similarity convolutional layer 310 to apply the similarity convolution operations to the network output feature for testing, to thereby generate at least one similarity embedding feature for testing, wherein the similarity convolution operations are adopted to output one or more embedding vectors for testing corresponding to at least part of pixels of the network output feature for testing; (c) the testing device performing a process of instructing the distance convolutional layer 410 to apply the distance convolution operations to the similarity embedding feature for testing, to thereby generate at least one distance embedding feature for testing, wherein the distance convolution operations are adopted to transform the similarity embedding feature for testing into at least one feature space for testing; and (d) the testing device performing a process of instructing the sampling layer 500 and at least one detecting layer 600 to recognize the lanes individually by sampling the distance embedding feature for testing and by finding locations of the lanes through regression, to thereby generate at least one instance segmentation for testing.

The present disclosure has an effect of detecting the objects by generating a result of the instance segmentation through the similarity embedding process and the distance embedding process on at least one feature map generated from the neural network.

The present disclosure has another effect of recognizing each of classes more clearly and extracting at least one edge part of each of the classes more accurately through the additional embedding processes, to thereby precisely recognize the object.

The learning method and the testing method may be provided to be used for detecting road user events including pedestrian events and vehicle events by using sensor fusion in a multi-camera system.

It would be understood by one of ordinary skill in the art that a transmission and/or a reception of the above-described images such as the training image and the test image can be performed by communication parts of the learning device and the testing device, and processes of the convolution operation, the deconvolution operation, and the loss value operation can be mainly performed by processors of the learning device and the testing device, but the present disclosure is not limited to these examples. In addition, the learning device and the testing device may further include memories capable of storing computer readable instructions for performing the above-described processes. As one example, the processor, the memory, a medium, etc. may be integrated with an integrated processor.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a compiler but also a high level language code that can be executed by a computer using an interpreter, etc. The hardware device can work as more than a software module to perform the process in accordance with the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A learning method for instance segmentation, comprising steps of:
    (a) a learning device performing a process of acquiring at least one network output feature from a neural network capable of detecting one or more objects in at least one training image;
    (b) the learning device performing a process of instructing at least one similarity convolutional layer to apply one or more similarity convolution operations to the network output feature, to thereby generate at least one similarity embedding feature, wherein the similarity convolution operations are adopted to output one or more embedding vectors corresponding to at least part of pixels of the network output feature;

(c) the learning device performing a similarity embedding process of instructing at least one similarity loss layer to output at least one similarity between two points sampled from the similarity embedding feature and to output at least one similarity loss by referring to the similarity and its corresponding at least one ground truth (GT) label image;

(d) the learning device performing a process of instructing at least one distance convolutional layer to apply one or more distance convolution operations to the similarity embedding feature, to thereby generate at least one distance embedding feature, wherein the distance convolution operations are adopted to transform the similarity embedding feature into at least one feature space;

(e) the learning device performing a distance embedding process of instructing at least one distance loss layer to calculate each of mean values and each of variance values of each of one or more instance classes by using the distance embedding feature, to thereby output at least one distance loss to be used for increasing each of inter-class differences among each of the mean values of the instance classes and decreasing each of intra-class variance values of each of the instance classes; and (f) the learning device performing a process of learning one or more parameters of at least one of the distance convolutional layer, the similarity convolutional layer, and the neural network by backpropagating at least one of the similarity loss and the distance loss.

2. The learning method of claim 1, further comprising a step of:

(g) the learning device performing a process of instructing at least one sampling layer and at least one detecting layer to recognize the objects individually by sampling the distance embedding feature and by finding locations of the objects through regression, to thereby generate at least one instance segmentation.

3. The learning method of claim 2, further comprising a step of:

(h) the learning device performing a process of instructing at least one segmentation loss layer to output at least one segmentation loss by referring to the instance segmentation and its corresponding at least one GT label image, to thereby learn the parameters of at least one of the distance convolutional layer, the similarity convolutional layer, and the neural network by backpropagating the segmentation loss.

4. The learning method of claim 1, wherein the GT label image is one corresponding to the instance segmentation.

5. The learning method of claim 1, wherein a range of change in the parameters of the similarity convolutional layer is determined as higher than that in the parameters of the neural network, and wherein a range of change in the parameters of the distance convolutional layer is determined as higher than that in the parameters of the neural network or that in the parameters of the similarity convolutional layer.

6. The learning method of claim 1, wherein the similarity is represented as a following equation $$s = \frac{2}{1 + \exp(\|f_p - f_q\|_2)}$$

where the $f_p$ and the $f_q$ represent the two points randomly sampled from the similarity embedding feature, and wherein the similarity loss is a cross entropy loss represented as a following equation $$\text{Similarity loss} = -\frac{1}{A} \sum_{p,q \in A} [y\log(s) + (1-y)\log(1-s)]$$

where the A represents the number of combinations acquired from the two points randomly sampled from the similarity embedding feature, the y is 1 if the two points are in a same class, or 0 if the points are in different classes, and the s represents the similarity.

7. The learning method of claim 1, wherein the objects represent one or more lanes.

8. The learning method of claim 7, wherein the distance loss is a clustering loss represented as a following equation $$\frac{\frac{1}{n} \sum_i \text{var}(L_i) + \frac{\sum_{L_1 \in Lanes, L_2 \in Lanes} \max(0, \text{thresh}^2 - (\text{mean}(L_1) - \text{mean}(L_2))^2)}{\text{n\_combination}(L_1, L_2)}}{\text{thresh}^2}$$

where the $L_1$ and the $L_2$ represent two lanes randomly selected from the lanes, the mean($L_1$) represents a mean value of the $L_1$, the mean($L_2$) represents a mean value of the $L_2$, the var($L_i$) represents each variance value of each lane among the lanes, the n_combination($L_1$,$L_2$) represents the number of cases of selecting every combination of any two lanes among the lanes, and the thresh represents a threshold.

9. The learning method of claim 8, wherein the thresh is set to be 1.

10. A testing method for instance segmentation, comprising steps of:

(a) on condition that a learning device (i) has performed a process of instructing at least one similarity convolutional layer to apply one or more similarity convolution operations to at least one network output feature for training acquired from a neural network capable of detecting one or more objects for training in at least one training image, to thereby generate at least one similarity embedding feature for training, wherein the similarity convolution operations are adopted to output one or more embedding vectors for training corresponding to at least part of pixels of the network output feature for training, (ii) has performed a similarity embedding process of instructing at least one similarity loss layer to output at least one similarity between two points sampled from the similarity embedding feature for training and to output at least one similarity loss by referring to the similarity and its corresponding at least one GT label image, (iii) has performed a process of instructing at least one distance convolutional layer to apply one or more distance convolution operations to the similarity embedding feature for training, to thereby generate at least one distance embedding feature for training, wherein the distance convolution operations are adopted to transform the similarity embedding feature for training into at least one feature space for training, (iv) has performed a distance embedding process of instructing at least one distance loss layer to calculate each of mean values and each of variance values of each of one or more instance classes by using the distance embedding feature for training, to thereby output at least one distance loss to be used for increasing each of inter-class differences among each of the mean values of the instance classes and decreasing each of intra-class variance values of each of the instance classes; and (v) has performed a process of learning one or more parameters of at least one of the distance convolutional layer, the similarity convolutional layer, and the neural network by backpropagating at least one of the similarity loss and the distance loss, a testing device acquiring at least one network output feature for testing from the neural network capable of detecting one or more objects for testing in at least one test image;

(b) the testing device performing a process of instructing the similarity convolutional layer to apply the similarity convolution operations to the network output feature for testing, to thereby generate at least one similarity embedding feature for testing, wherein the similarity convolution operations are adopted to output one or more embedding vectors for testing corresponding to at least part of pixels of the network output feature for testing;

(c) the testing device performing a process of instructing the distance convolutional layer to apply the distance convolution operations to the similarity embedding feature for testing, to thereby generate at least one distance embedding feature for testing, wherein the distance convolution operations are adopted to transform the similarity embedding feature for testing into at least one feature space for testing; and (d) the testing device performing a process of instructing at least one sampling layer and at least one detecting layer to recognize one or more objects for testing individually by sampling the distance embedding feature for testing and by finding locations of the objects for testing through regression, to thereby generate at least one instance segmentation for testing.

11. The testing method of claim 10, wherein, at the step of (a), the learning device further has performed processes of (vi) instructing the sampling layer and the detecting layer to recognize the objects for training individually by sampling the distance embedding feature for training and by finding locations of the objects for training through the regression, to thereby generate at least one instance segmentation for training and (vii) instructing at least one segmentation loss layer to output at least one segmentation loss by referring to the instance segmentation for training and its corresponding at least one GT label image, to thereby learn the parameters of at least one of the distance convolutional layer, the similarity convolutional layer, and the neural network by backpropagating the segmentation loss.

12. The testing method of claim 10, wherein the GT label image is one corresponding to the instance segmentation for training.

13. The testing method of claim 10, wherein a range of change in the parameters of the similarity convolutional layer is determined as higher than that in the parameters of the neural network, and
wherein a range of change in the parameters of the distance convolutional layer is determined as higher than that in the parameters of the neural network or that in the parameters of the similarity convolutional layer.

14. The testing method of claim 10, wherein the similarity is represented as a following equation $$s = \frac{2}{1+\exp(\|f_p - f_q\|_2)}$$

where the $f_p$ and the $f_q$ represent the two points randomly sampled from the similarity embedding feature, and
wherein the similarity loss is a cross entropy loss represented as a following equation $$\text{Similarity loss} = -\frac{1}{A}\sum_{p,q \in A}[y\log(s) + (1-y)\log(1-s)]$$

where the A represents the number of combinations acquired from the two points randomly sampled from the similarity embedding feature, the y is 1 if the two points are in a same class, or 0 if the points are in different classes, and the s represents the similarity.

15. The testing method of claim 10, wherein the objects for training represents one or more lanes, and
wherein the distance loss is a clustering loss represented as a following equation $$\frac{\frac{1}{n}\sum_i \text{var}(L_i) + \dfrac{\sum_{L_1 \in Lanes, L_2 \in Lanes} \max(0, \text{thresh}^2 - (\text{mean}(L_1) - \text{mean}(L_2))^2)}{\text{n\_combination}(L_1, L_2)}}{\text{thresh}^2}$$

where the $L_1$ and the $L_2$ represent two lanes randomly selected from the lanes, the mean($L_1$) represents a mean value of the $L_1$, the mean($L_2$) represents a mean value of the $L_2$, the var($L_i$) represents each variance value of each lane among the lanes, the n_combination($L_1,L_2$) represents the number of cases of selecting every combination of any two lanes among the lanes, and the thresh represents a threshold.

16. A learning device for instance segmentation, comprising:
at least one memory that stores instructions; and
at least one processor configured to execute the instructions to: (I) perform a process of instructing at least one similarity convolutional layer to apply one or more similarity convolution operations to at least one network output feature acquired from a neural network capable of detecting one or more objects in at least one training image, to thereby generate at least one similarity embedding feature, wherein the similarity convolution operations are adopted to output one or more embedding vectors corresponding to at least part of pixels of the network output feature, (II) perform a similarity embedding process of instructing at least one similarity loss layer to output at least one similarity between two points sampled from the similarity embedding feature and to output at least one similarity loss by referring to the similarity and its corresponding at least one GT label image, (III) perform a process of instructing at least one distance convolutional layer to apply one or more distance convolution operations to the similarity embedding feature, to thereby generate at least one distance embedding feature, wherein the distance convolution operations are adopted to transform the similarity embedding feature into at least one feature space, (IV) perform a distance embedding process of instructing at least one distance loss layer to calculate each of mean values and each of variance values of each of one or more instance classes by using the distance embedding feature, to thereby output at least one distance loss to be used for increasing each of inter-class differences among each of the mean values of the instance classes and decreasing each of intra-class variance values of each of the instance classes, and (V) perform a process of learning one or more parameters of at least one of the distance convolutional layer, the similarity convolutional layer, and the neural network by backpropagating at least one of the similarity loss and the distance loss.

17. The learning device of claim 16, wherein the processor further performs a process of:
(VI) instructing at least one sampling layer and at least one detecting layer to recognize the objects individually by sampling the distance embedding feature and by finding locations of the objects through regression, to thereby generate at least one instance segmentation.

18. The learning device of claim 17, wherein the processor further performs a process of:
(VII) instructing at least one segmentation loss layer to output at least one segmentation loss by referring to the instance segmentation and its corresponding at least one GT label image, to thereby learn the parameters of at least one of the distance convolutional layer, the similarity convolutional layer, and the neural network by backpropagating the segmentation loss.

19. The learning device of claim 16, wherein the GT label image is one corresponding to the instance segmentation.

20. The learning device of claim 16, wherein a range of change in the parameters of the similarity convolutional layer is determined as higher than that in the parameters of the neural network, and
wherein a range of change in the parameters of the distance convolutional layer is determined as higher than that in the parameters of the neural network or that in the parameters of the similarity convolutional layer.

21. The learning device of claim 16, wherein the similarity is represented as a following equation $$s = \frac{2}{1 + \exp(\|f_p - f_q\|_2)}$$

where the $f_p$ and the $f_q$ represent the two points randomly sampled from the similarity embedding feature, and
wherein the similarity loss is a cross entropy loss represented as a following equation $$\text{Similarity loss} = -\frac{1}{A} \sum_{p,q \in A} [y\log(s) + (1-y)\log(1-s)]$$

where the A represents the number of combinations acquired from the two points randomly sampled from the similarity embedding feature, the y is 1 if the two points are in a same class, or 0 if the points are in different classes, and the s represents the similarity.

22. The learning device of claim 16, wherein the objects represent one or more lanes.

23. The learning device of claim 22, wherein the distance loss is a clustering loss represented as a following equation $$\frac{\frac{1}{n}\sum_i \text{var}(L_i) + \frac{\sum_{L_1 \in Lanes, L_2 \in Lanes} \max(0, \text{thresh}^2 - (\text{mean}(L_1) - \text{mean}(L_2))^2)}{\text{n\_combination}(L_1, L_2)}}{\text{thresh}^2}$$

where the $L_1$ and the $L_2$ represent two lanes randomly selected from the lanes, the mean($L_1$) represents a mean value of the $L_1$, the mean($L_2$) represents a mean value of the $L_2$, the var($L_i$) represents each variance value of each lane among the lanes, the n_combination($L_1$,$L_2$) represents the number of cases of selecting every combination of any two lanes among the lanes, and the thresh represents a threshold.

24. The learning device of claim 23, wherein the thresh is set to be 1.

25. A testing device for instance segmentation, comprising:
at least one memory that stores instructions; and
at least one processor, on condition that a learning device (i) has performed a process of instructing at least one similarity convolutional layer to apply one or more similarity convolution operations to at least one network output feature for training acquired from the neural network capable of detecting one or more objects for training in at least one training image, to thereby generate at least one similarity embedding feature for training, wherein the similarity convolution operations are adopted to output one or more embedding vectors for training corresponding to at least part of pixels of the network output feature for training, (ii) has performed a similarity embedding process of instructing at least one similarity loss layer to output at least one similarity between two points sampled from the similarity embedding feature for training and to output at least one similarity loss by referring to the similarity and its corresponding at least one GT label image, (iii) has performed a process of instructing at least one distance convolutional layer to apply one or more distance convolution operations to the similarity embedding feature for training, to thereby generate at least one distance embedding feature for training, wherein the distance convolution operations are adopted to transform the similarity embedding feature for training into at least one feature space for training, (iv) has performed a distance embedding process of instructing at least one distance loss layer to calculate each of mean values and each of variance values of each of one or more instance classes by using the distance embedding feature for training, to thereby output at least one distance loss to be used for increasing each of inter-class differences among each of the mean values of the instance classes and decreasing each of intra-class variance values of each of the instance classes; and (v) has performed a process of learning one or more parameters of at least one of the distance convolutional layer, the similarity convolutional layer, and the neural network by backpropagating at least one of the similarity loss and the distance loss; configured to execute the instructions to: (I) perform a process of instructing the similarity convolutional layer to apply the similarity convolution operations to at least one network output feature for testing acquired from the neural network capable of detecting one or more objects for testing in at least one test image, to thereby generate at least one similarity embedding feature for testing, wherein the similarity convolution operations are adopted to output one or more embedding vectors for testing corresponding to at least part of pixels of the network output feature for testing, (II) perform a process of instructing the distance convolutional layer to apply the distance convolution operations to the similarity embedding feature for testing, to thereby generate at least one distance embedding feature for testing, wherein the distance convolution operations are adopted to transform the similarity embedding feature for testing into at least one feature space for testing, and (III) perform a process of instructing at least one sampling layer and at least one detecting layer to recognize the objects for testing individually by sampling the distance embedding feature for testing and by finding locations of the objects for testing through regression, to thereby generate at least one instance segmentation for testing.

26. The testing device of claim 25, wherein, the learning device further has performed processes of (vi) instructing the sampling layer and the detecting layer to recognize the objects for training individually by sampling the distance embedding feature for training and by finding locations of the objects for training through the regression, to thereby generate at least one instance segmentation for training and (vii) instructing at least one segmentation loss layer to output at least one segmentation loss by referring to the instance segmentation for training and its corresponding at least one GT label image, to thereby learn the parameters of at least one of the distance convolutional layer, the similarity convolutional layer, and the neural network by backpropagating the segmentation loss.

27. The testing device of claim 25, wherein the GT label image is one corresponding to the instance segmentation for training.

28. The testing device of claim 25, wherein a range of change in the parameters of the similarity convolutional layer is determined as higher than that in the parameters of the neural network, and
wherein a range of change in the parameters of the distance convolutional layer is determined as higher than that in the parameters of the neural network or that in the parameters of the similarity convolutional layer.

29. The testing device of claim 25, wherein the similarity is represented as a following equation $$s = \frac{2}{1 + \exp(\|f_p - f_q\|_2)}$$

where the $f_p$ and the $f_q$ represent the two points randomly sampled from the similarity embedding feature, and
wherein the similarity loss is a cross entropy loss represented as a following equation $$\text{Similarity loss} = -\frac{1}{A} \sum_{p,q \in A} [y\log(s) + (1-y)\log(1-s)]$$

where the A represents the number of combinations acquired from the two points randomly sampled from the similarity embedding feature, the y is 1 if the two points are in a same class, or 0 if the points are in different classes, and the s represents the similarity.

30. The testing device of claim 25, wherein the objects for training represents one or more lanes, and
wherein the distance loss is a clustering loss represented as a following equation $$\frac{\frac{1}{n}\sum_i \text{var}(L_i) + \frac{\sum_{L_1 \in Lanes, L_2 \in Lanes} \max(0, \text{thresh}^2 - (\text{mean}(L_1) - \text{mean}(L_2))^2)}{\text{n\_combination}(L_1, L_2)}}{\text{thresh}^2}$$

where the $L_1$ and the $L_2$ represent two lanes randomly selected from the lanes, the mean($L_1$) represents a mean value of the $L_1$, the mean($L_2$) represents a mean value of the $L_2$, the var($L_i$) represents each variance value of each lane among the lanes, the n_combination($L_1$,$L_2$) represents the number of cases of selecting every combination of any two lanes among the lanes, and the thresh represents a threshold.

* * * * *